(12) United States Patent
Sullivan et al.

(10) Patent No.: US 11,763,173 B2
(45) Date of Patent: *Sep. 19, 2023

(54) ENSEMBLE-BASED MULTIMEDIA ASSET RECOMMENDATION SYSTEM

(71) Applicant: IRIS.TV, INC., Los Angeles, CA (US)

(72) Inventors: Thomas J. Sullivan, Los Angeles, CA (US); Joel Spitalnik, Los Angeles, CA (US)

(73) Assignee: IRIS.TV, INC., Los Angeles, CA (US)

( * ) Notice: Subject to any disclaimer, the term of this patent is extended or adjusted under 35 U.S.C. 154(b) by 315 days.

This patent is subject to a terminal disclaimer.

(21) Appl. No.: 14/811,803

(22) Filed: Jul. 28, 2015

(65) Prior Publication Data

US 2016/0027057 A1 Jan. 28, 2016

Related U.S. Application Data

(60) Provisional application No. 62/029,713, filed on Jul. 28, 2014.

(51) Int. Cl.
| | |
|---|---|
| *G06Q 30/02* | (2023.01) |
| *G06N 5/04* | (2023.01) |
| *G06F 16/438* | (2019.01) |
| *G06F 16/9535* | (2019.01) |
| *G06F 16/48* | (2019.01) |
| *G06Q 30/0251* | (2023.01) |

(52) U.S. Cl.
CPC ............ *G06N 5/04* (2013.01); *G06F 16/438* (2019.01); *G06F 16/48* (2019.01); *G06F 16/9535* (2019.01); *G06Q 30/0263* (2013.01)

(58) Field of Classification Search
CPC ............ G06Q 30/02–0277; G06N 5/04; G06F 16/9535; G06F 16/48
See application file for complete search history.

(56) References Cited

U.S. PATENT DOCUMENTS 6,826,559 B1 * 11/2004 Ponte ................... G06F 16/9535
6,847,965 B2 *  1/2005 Walker .................. G07F 17/246
                                                    707/999.005

(Continued)

FOREIGN PATENT DOCUMENTS

| | | |
|---|---|---|
| JP | 2008-193431 | 8/2008 |
| WO | WO2013001071 | 1/2013 |

OTHER PUBLICATIONS

Headline: Getting in Tune Harris,Javacian. Courier—Journal:V. 15.Louisville,Ky.:GannettCo., Inc.(Jan. 11, 2006) FullText (Year: 2006).*

(Continued)

*Primary Examiner* — Raquel Alvarez
(74) *Attorney, Agent, or Firm* — Shield Intellectual Property PC; Zhichong Gu

(57) ABSTRACT

An asset to be displayed during an online engagement is identified. A mixture of multimedia assets that include any combination of: audio, video, text, or image, are selected to be displayed simultaneously with the asset. Each multimedia asset selected based at least on a relationship between the multimedia asset and the asset to be displayed during the online engagement. A presentation screen is created that includes the selected multimedia assets and the asset to be displayed during the online engagement based on display parameters of a receiving device.

27 Claims, 10 Drawing Sheets

Sample Layout

(56) References Cited

U.S. PATENT DOCUMENTS

| | | | |
|---|---|---|---|
| 8,275,661 B1* | 9/2012 | Ponte | G06F 16/951 |
| | | | 705/14.54 |
| 2003/0023427 A1 | 1/2003 | Cassin et al. | |
| 2003/0217061 A1 | 11/2003 | Agassi et al. | |
| 2005/0193335 A1 | 9/2005 | Dorai et al. | |
| 2006/0106642 A1* | 5/2006 | Reicher | G06F 19/321 |
| | | | 705/2 |
| 2008/0307454 A1 | 12/2008 | Ahanger et al. | |
| 2009/0006368 A1 | 1/2009 | Mei et al. | |
| 2009/0158342 A1 | 6/2009 | Mercer et al. | |
| 2010/0076991 A1 | 3/2010 | Nakano et al. | |
| 2010/0169331 A1 | 7/2010 | Karidi et al. | |
| 2011/0072448 A1 | 3/2011 | Stiers et al. | |
| 2011/0173054 A1* | 7/2011 | Kutaragi | G06Q 30/02 |
| | | | 705/14.5 |
| 2011/0202961 A1* | 8/2011 | Asano | G08B 21/0423 |
| | | | 725/46 |
| 2011/0320380 A1 | 12/2011 | Zahn et al. | |
| 2011/0320437 A1 | 12/2011 | Kim et al. | |
| 2012/0151511 A1* | 6/2012 | Bernard | H04H 60/37 |
| | | | 725/10 |
| 2013/0216200 A1 | 8/2013 | Howett | |
| 2014/0095320 A1* | 4/2014 | Sivaramakrishnan | H04L 67/22 |
| | | | 705/14.66 |
| 2014/0344061 A1* | 11/2014 | Choi | G06Q 30/0267 |
| | | | 705/14.66 |
| 2015/0310488 A1 | 10/2015 | Hess et al. | |
| 2016/0026920 A1 | 1/2016 | Sullivan et al. | |
| 2016/0277244 A1* | 9/2016 | Reichert, Jr. | H04L 41/0823 |
| 2016/0345062 A1* | 11/2016 | Klappert | H04N 21/4667 |
| 2017/0235848 A1 | 8/2017 | Dusen et al. | |
| 2019/0026920 A1 | 1/2019 | Yi et al. | |
| 2020/0097840 A1 | 3/2020 | Burns et al. | |

OTHER PUBLICATIONS

World Intellectual Property Organization, Application No. PCT/US15/42547, International Search Report dated Oct. 12, 2015.
World Intellectual Property Organization, Application No. PCT/US15/42547, Pending Claims as of Oct. 12, 2015.
World Intellectual Property Organization, Application No. PCT/US15/00079, International Search Report dated Nov. 19, 2015.
World Intellectual Property Organization, Application No. PCT/US15/00079, Pending Claims as of Nov. 19, 2015.
European Patent Office, Application No. 15826878.9, Extended European Search Report dated Jul. 26, 2017.
European Patent Office, Application No. 15826878.9, Pending Claims as of Jul. 26, 2017.
European Patent Office, Application No. 15747932.0, Foreign Office Action dated Mar. 9, 2017.
European Patent Office, Application No. 15747932.0, Pending Claims as of Mar. 9, 2017.
European Patent Office, Application No. 15747932.0, Foreign Office Action dated Oct. 18, 2018.
European Patent Office, Application No. 15747932.0, Summons to Attend Oral Hearings dated Mar. 22, 2019.
European Patent Office, Application No. 15826878.9, Foreign Office Action dated Dec. 21, 2018.
U.S. Appl. No. 14/811,824, Non-Final Office Action dated Oct. 26, 2018.
U.S. Appl. No. 14/811,824, Non-Final Office Action dated Jan. 21, 2020.
European Patent Office, Application No. 15826878.9, Summons to Attend Oral Hearings dated Aug. 14, 2020.
Han et al, "Evaluation of User Reputation on YouTube", 12th European Conference on Computer Vision, ECCV 2012; [Lecture Notes in Computer Science], pp. 346-353, XP047541589, ISSN: 0302-9743, ISBN: 978-3-642-36741-0.
U.S. Appl. No. 14/811,824, Final Office Action dated Jul. 17, 2020.
U.S. Appl. No. 14/811,824, Final Office Action dated May 27, 2021.
U.S. Appl. No. 14/811,824, Non-Final Office Action dated Jan. 28, 2021.
U.S. Appl. No. 14/811,824, Final Office Action dated May 2, 2022.
U.S. Appl. No. 14/811,824, Non-Final Office Action dated Dec. 15, 2021.
U.S. Appl. No. 14/811,824, Notice of Allowance dated Aug. 29, 2022.
U.S. Appl. No. 14/811,824, Final Office Action dated Jul. 5, 2019.

* cited by examiner

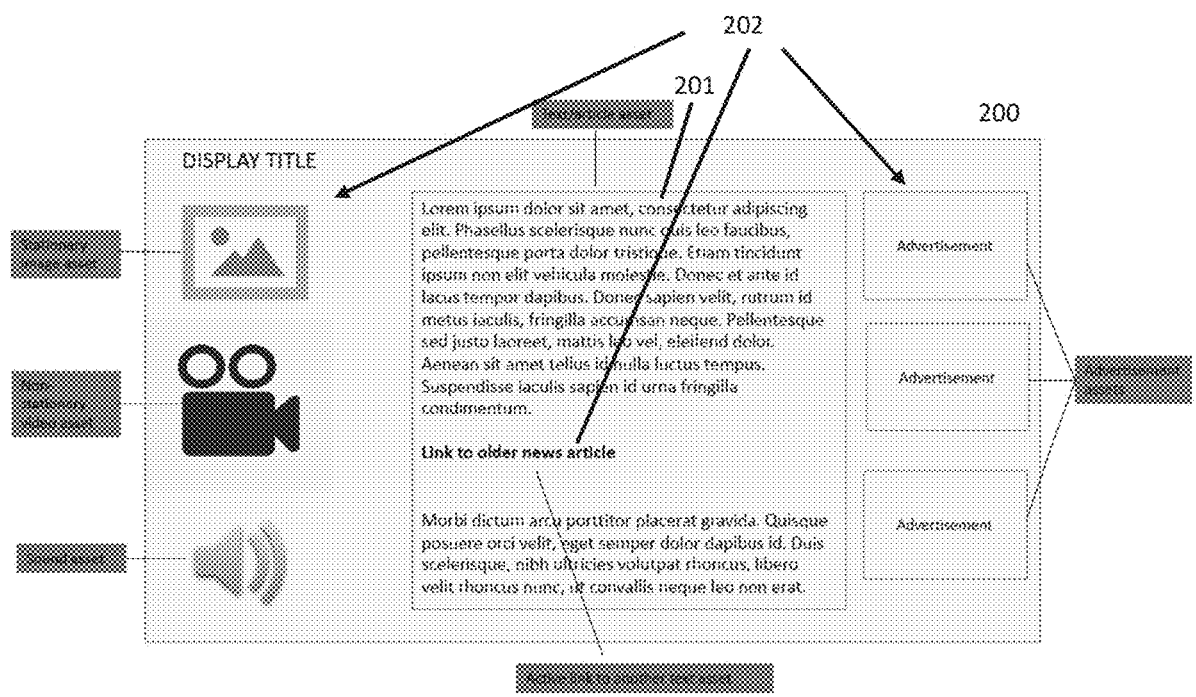
FIG. 2. Example Display Layout of an Ensemble of Multimedia Assets

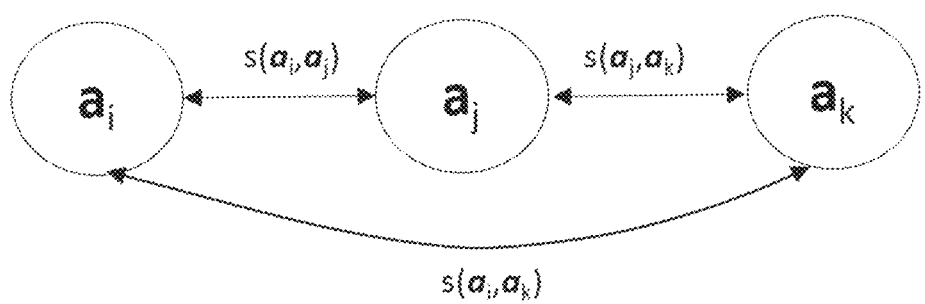
FIG. 3. Pairwise Comparison Example of Three Assets

| Asset | Feature 1 | Feature 2 | Feature 3 |
|---|---|---|---|
| $a_i$ | $x_{i,1} = .50$ | $x_{i,2} = .45$ | $x_{i,3} = .50$ |
| $a_j$ | $x_{j,1} = .60$ | $x_{j,2} = .30$ | $x_{j,3} = .61$ |
| $a_k$ | $x_{k,1} = .10$ | $x_{k,2} = .15$ | $x_{k,3} = .15$ |

FIG. 4. Example Asset Feature Values

| Asset | Pairwise Absolute Differences Among Assets for Feature 1 | | |
|---|---|---|---|
| | $a_i$ | $a_j$ | $a_k$ |
| $a_i$ | $\|x_{i,1} - x_{i,1}\| = \|.50 - .50\| = 0$ | $\|x_{i,1} - x_{j,1}\| = \|.50 - .60\| = .10$ | $\|x_{i,1} - x_{k,1}\| = \|.50 - .10\| = .40$ |
| $a_j$ | $\|x_{j,1} - x_{i,1}\| = \|.60 - .50\| = .10$ | $\|x_{j,1} - x_{j,1}\| = \|.60 - .60\| = 0$ | $\|x_{j,1} - x_{k,1}\| = \|.60 - .10\| = .50$ |
| $a_k$ | $\|x_{k,1} - x_{i,1}\| = \|.10 - .50\| = .40$ | $\|x_{k,1} - x_{j,1}\| = \|.10 - .60\| = .50$ | $\|x_{k,1} - x_{k,1}\| = \|.10 - .10\| = 0$ |

FIG. 5. Absolute Values of Pairwise Differences for Feature 1 in the Example Data

| Asset | Pairwise Absolute Differences Among Assets for Feature 2 | | |
|---|---|---|---|
| | $a_i$ | $a_j$ | $a_k$ |
| $a_i$ | $\|x_{i,2} - x_{i,2}\| = \|.45 - .45\| = 0$ | $\|x_{i,2} - x_{j,2}\| = \|.45 - .30\| = .15$ | $\|x_{i,2} - x_{k,2}\| = \|.45 - .15\| = .30$ |
| $a_j$ | $\|x_{j,2} - x_{i,2}\| = \|.30 - .45\| = .15$ | $\|x_{j,2} - x_{j,2}\| = \|.30 - .30\| = 0$ | $\|x_{j,2} - x_{k,2}\| = \|.30 - .15\| = .15$ |
| $a_k$ | $\|x_{k,2} - x_{i,2}\| = \|.15 - .45\| = .30$ | $\|x_{k,2} - x_{j,2}\| = \|.15 - .30\| = .15$ | $\|x_{k,2} - x_{k,2}\| = \|.15 - .15\| = 0$ |

FIG. 6. Absolute Values of Pairwise Differences for Feature 2 in the Example Data

| Asset | Pairwise Absolute Differences Among Assets for Feature 3 | | |
|---|---|---|---|
| | $a_i$ | $a_j$ | $a_k$ |
| $a_i$ | $\|x_{i,3} - x_{i,3}\| = \|.50 - .50\| = 0$ | $\|x_{i,3} - x_{j,3}\| = \|.50 - .61\| = .11$ | $\|x_{i,3} - x_{k,3}\| = \|.50 - .15\| = .35$ |
| $a_j$ | $\|x_{j,3} - x_{i,3}\| = \|.61 - .50\| = .11$ | $\|x_{j,3} - x_{j,3}\| = \|.61 - .61\| = 0$ | $\|x_{j,3} - x_{k,3}\| = \|.61 - .15\| = .46$ |
| $a_k$ | $\|x_{k,3} - x_{i,3}\| = \|.15 - .50\| = .35$ | $\|x_{k,3} - x_{j,3}\| = \|.15 - .61\| = .46$ | $\|x_{k,3} - x_{k,3}\| = \|.15 - .15\| = 0$ |

FIG. 7. Absolute Values of Pairwise Differences for Feature 3 in the Example Data

| Asset | Composite Differences with weights= (.50,.40,.10)  sum of weight= .50+.40+.10 = 1, y=1 | | |
|---|---|---|---|
| | $a_i$ | $a_j$ | $a_k$ |
| $a_i$ | $.50 \cdot \|x_{i,1} - x_{i,1}\| + .40 \cdot \|x_{i,2} - x_{i,2}\| + .10 \cdot \|x_{i,3} - x_{i,3}\| =$ $(.50 \cdot 0) + (.40 \cdot 0) + (.10 \cdot 0) =$ $0$ | $.50 \cdot \|x_{i,1} - x_{j,1}\| + .40 \cdot \|x_{i,2} - x_{j,2}\| + .10 \cdot \|x_{i,3} - x_{j,3}\| =$ $(.50 \cdot .10) + (.40 \cdot .15) + (.10 \cdot .11) =$ $.121$ | $.50 \cdot \|x_{i,1} - x_{k,1}\| + .40 \cdot \|x_{i,2} - x_{k,2}\| + .10 \cdot \|x_{i,3} - x_{k,3}\| =$ $(.50 \cdot .40) + (.40 \cdot .30) + (.10 \cdot .35) =$ $.355$ |
| $a_j$ | $.50 \cdot \|x_{j,1} - x_{i,1}\| + .40 \cdot \|x_{j,2} - x_{i,2}\| + .10 \cdot \|x_{j,3} - x_{i,3}\| =$ $(.50 \cdot .10) + (.40 \cdot .15) + (.10 \cdot .11) =$ $.121$ | $.50 \cdot \|x_{j,1} - x_{j,1}\| + .40 \cdot \|x_{j,2} - x_{j,2}\| + .10 \cdot \|x_{j,3} - x_{j,3}\| =$ $(.50 \cdot 0) + (.40 \cdot 0) + (.10 \cdot 0) =$ $0$ | $.50 \cdot \|x_{j,1} - x_{k,1}\| + .40 \cdot \|x_{j,2} - x_{k,2}\| + .10 \cdot \|x_{j,3} - x_{k,3}\| =$ $(.50 \cdot .50) + (.40 \cdot .15) + (.10 \cdot .46) =$ $.356$ |
| $a_k$ | $.50 \cdot \|x_{k,1} - x_{i,1}\| + .40 \cdot \|x_{k,2} - x_{i,2}\| + .10 \cdot \|x_{k,3} - x_{i,3}\| =$ $(.50 \cdot .40) + (.40 \cdot .30) + (.10 \cdot .35) =$ $.355$ | $.50 \cdot \|x_{k,1} - x_{j,1}\| + .40 \cdot \|x_{k,2} - x_{j,2}\| + .10 \cdot \|x_{k,3} - x_{j,3}\| =$ $(.50 \cdot .50) + (.40 \cdot .15) + (.10 \cdot .46) =$ $.356$ | $.50 \cdot \|x_{k,1} - x_{k,1}\| + .40 \cdot \|x_{k,2} - x_{k,2}\| + .10 \cdot \|x_{k,3} - x_{k,3}\| =$ $(.50 \cdot 0) + (.40 \cdot 0) + (.10 \cdot 0) =$ $0$ |

FIG. 8. Composite Weighted Differences for the Example Data $$s(a_i, a_i) = 1 - 0 = 0$$
$$s(a_j, a_j) = 1 - 0 = 0$$
$$s(a_k, a_k) = 1 - 0 = 0$$
$$s(a_i, a_j) = s(a_j, a_i) = 1 - .121 = .879$$
$$s(a_i, a_k) = s(a_k, a_i) = 1 - .355 = .645$$
$$s(a_j, a_k) = s(a_k, a_j) = 1 - .356 = .644$$

FIG. 9. Weighted Asset-to-Asset Similarity for Each Pair of Assets in the Example Data FIG. 10. Sample Layout

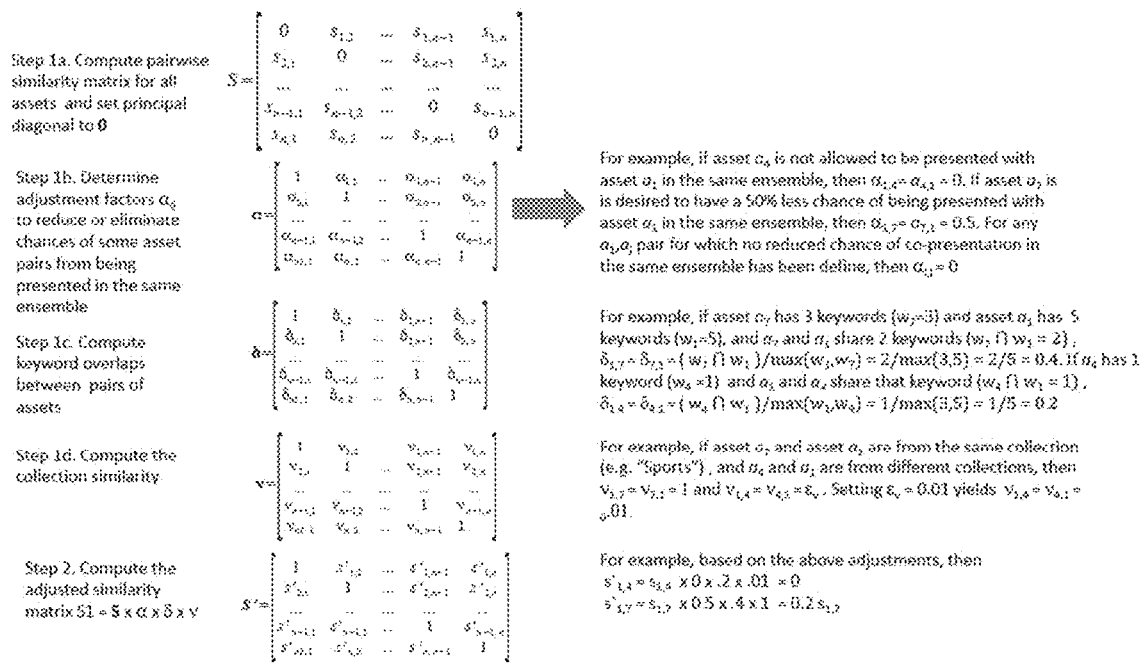
FIG. 11. Creating an adjusted similarity matrix based

FIG. 12. Matching assets with section and slot requirements

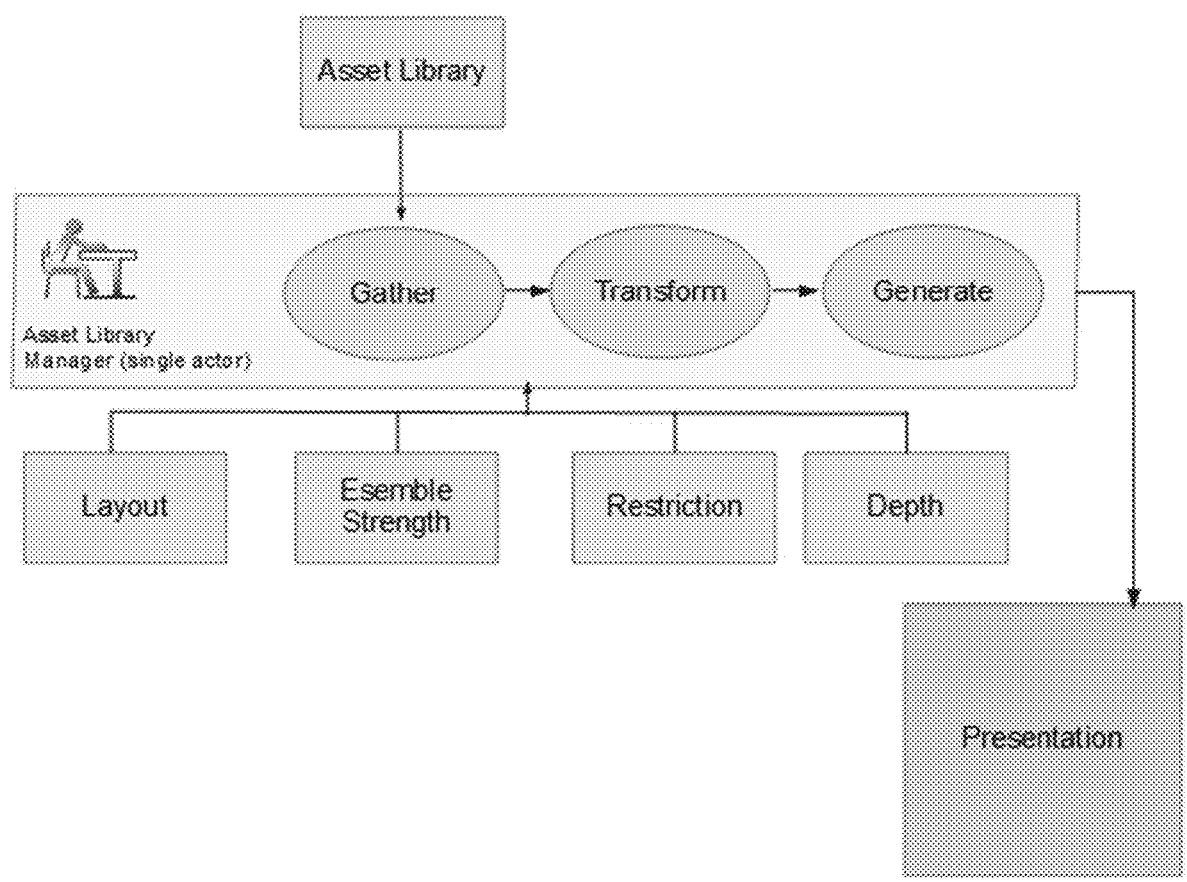
FIG. 13. Steps performed by a single actor

ENSEMBLE-BASED MULTIMEDIA ASSET RECOMMENDATION SYSTEM

CROSS-REFERENCE TO RELATED APPLICATIONS; PRIORITY CLAIM

This application claims benefit of Provisional Application No. 62/029,713, filed Jul. 28, 2014, the entire contents of which is incorporated by reference as if fully set forth herein under 35 U.S.C. § 120.

TECHNICAL FIELD

The present disclosure generally relates to the automatic selection of multimedia content.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Content suggestion systems traditionally select content based on a relationship to a user's preferences or a relationship to parameters of a search query. Recommendation engines use keyword or tags in order to select content that match a particular content selected by a user. These systems have a singular function that is focused on presenting a set of content that is similar in type, e.g., video, to the content being accessed by the user. Further, these systems typically present the suggested content to the user in a list format. Content providers lack a mechanism for getting assets from their mixed-multimedia asset libraries in front of users and to present the mixed-multimedia assets to users in meaningful and engaging ways.

BRIEF DESCRIPTION OF THE DRAWINGS

In the drawings:

FIG. 2 illustrates an example layout of an ensemble of electronic assets, according to an embodiment of the invention;

FIG. 3 illustrates an example of pairwise comparison of assets, according to an embodiment of the invention;

FIG. 4 illustrates an example of feature values for three assets according to an embodiment of the invention;

FIG. 5 illustrates an example of the absolute value of differences of assets for feature 1 of the example data, according to an embodiment of the invention;

FIG. 6 illustrates an example of the absolute value of differences of assets for feature 2 of the example data, according to an embodiment of the invention;

FIG. 7 illustrates an example of the absolute value of differences of assets for feature 3 of the example data, according to an embodiment of the invention;

FIG. 8 illustrates an example of the weighted composite differences of assets for feature 1, 2, and 3, of the example data, according to an embodiment of the invention;

FIG. 9 illustrates an example of the weighted asset-to-asset similarities of each pair of assets in the example data, according to an embodiment of the invention;

FIG. 10 illustrates an example display layout, according to an embodiment of the invention;

FIG. 11 illustrates an example of how the adjusted similarity matrix is computed, according to an embodiment of the invention;

FIG. 12 illustrates an example matching assets with section and slot requirements, according to an embodiment of the invention;

FIG. 13 illustrates an example system block diagram, according to an embodiment of the invention.

DETAILED DESCRIPTION

Figure 1:
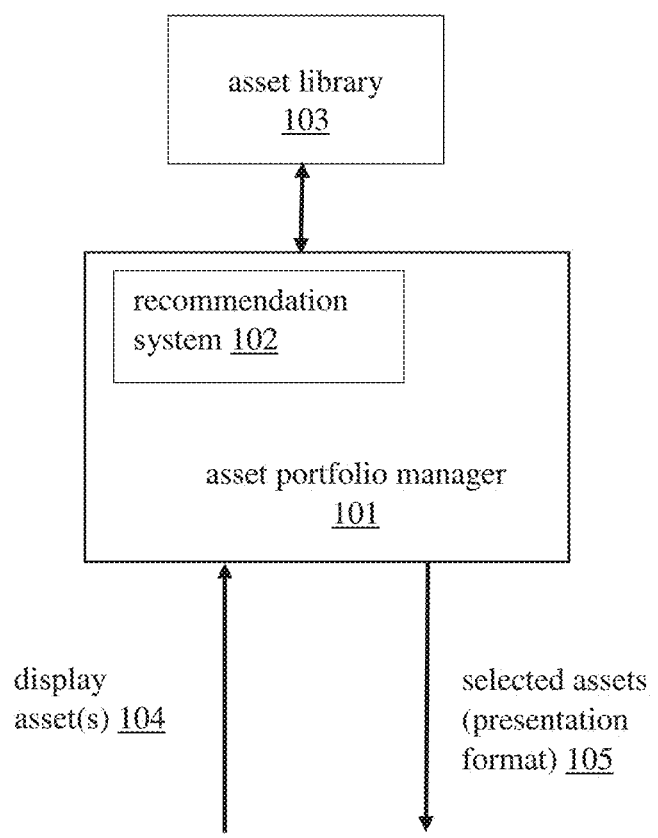
FIG. 1 illustrates block diagram of an asset portfolio manager, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Methodology
2.1. Ensemble Strength
2.2. Ensemble Duplication
2.3. Ensemble Depth
2.4. Construction of Ensembles
2.4.1. Similarity Matrix Preparation for Ensemble Construction
2.4.2. Weak Ensemble Construction
2.4.3. Strong Ensemble Construction
2.4.4. Semi-strong Ensemble Construction
2.4.5. Improved Semi-strong Ensemble Construction
2.5 Layout Comparison
3.0 Example Embodiments
4.0 Implementation Mechanisms—Hardware Overview
5.0. Extensions and Alternatives

1.0. General Overview

This overview presents a basic description of some aspects of a possible embodiment of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiment in a condensed and simplified format, and should be understood as merely a conceptual prelude to a more detailed description of example possible embodiments that follows below.

Disclosed herein are systems and methods for pairing assets for online presentation where the plurality of electronic assets are available in a wide range of formats. The processes associated with selection and ordering of these assets to be made available for consumption in an online environment is increasingly becoming more data-driven and requiring that electronically-stored assets of different formats be presented as an ensemble or collection. A non-exhaustive list of asset types include text (TXT, HTML, etc.), images (GIF, JPG, TIFF, BMP, PNG, etc.), videos (MP4, WMV, FLV, etc.), geographic (SHP, KML, etc.), coded (JavaScript, PHP, etc.), and sound (MP3, WMV, QT, etc.) files. The asset itself is a distinct electronic file that may be presented to a user for consumption either by itself or simultaneously with other electronic files.

For each asset type, both the storage/presentation requirements and resulting consumption of the assets may differ and require cognitive processing by using one or more of the human user's five senses: sound, sight, touch, taste, and smell. An engagement is the timeframe during which a user is consuming the electronic asset using one or more of the five human senses. Presentation of information to the human user may appeal to one or more of these senses and there exists a business purpose for pairing files of the various types to increase the user's satisfaction with their consumption and thereby allowing the asset portfolio manager (the individual responsible for deciding upon the assets to display) to yields some desirable benefit from a satisfactory consumption of the assets. The concept of pairing assets is not restricted to two distinct assets—rather, a collection of assets (containing at least two assets) is selected for presentation during a single engagement by a user. An asset may be categorized as stationary or non-stationary. A stationary asset will not change over time—examples include an image, a non-interactive electronic map, or a sound file with a single tone ("ding", "beep", etc.). Non-stationary assets are electronic files that vary over time such as a video, an animated image, a song, or an interactive map. The changes over time that cause an electronic asset to be considered non-stationary can be a) executed automatically when an appropriate application exists that allows the temporal variations to be presented; b) triggered according to the internal clock of the device—where available; or c) initiated interactively by the electronic assets' consumer during an engagement.

Management of an asset collection may be conducted by the owner of the collection or another party given authorization to generate recommendations and pursue revenue acquisition on behalf of the owner. This entity may also be referred to as the "asset portfolio manager". Referring to FIG. 1, the asset portfolio manager 101 may be software and/or hardware resident in a server, client computer, distributed cloud computing system, virtual machine, etc. An embodiment performs a methodology for pairing multimedia assets in a single presentation via an ensemble of assets with the intent of enriching and lengthening the engagement experience to allow a higher level of value to be achieved by the content provider Value may be based on an objective function determined by the asset portfolio manager and may include, but is not limited to: a) maximization of revenue b) user satisfaction c) recurrence of visitors. Allowing the user to more deeply explore related assets in a variety of different formats, in perhaps more detail, and/or by appealing to various sensory modes is assumed to lead to a preferred engagement for the user. Over time, the rotation of different number, placement, and types of assets can be used to determine which presentations yield higher revenues. The system therefore not only enriches the user experience through a co-presentation of a collection of multi-sensory and multimedia assets, but provides a mechanism for testing various layouts to yield a value outcome that is perhaps more favorable to the owner/managers of the displayable content.

During an online engagement where a recommendation system algorithm 102 considers candidate assets stored in the asset library 103 and available for presentation and consumption by a user, there often arises the desire to use the available device presentation capabilities to present more than one asset at the same time in the shared display space.

The asset portfolio manager may be interested in simultaneous co-presentation of a set of assets related to the online asset 104 to enhance the viewing experience and provide a means of presenting the content in a way that appeals to the multi-sensory capabilities of human consumers. The asset portfolio manager—which has access to a library of multimedia assets 103 available to be displayed (either remotely over a network, such as an intranet, internet, etc., or locally over a local network of connection)—automatically selects which assets are most appropriate for co-display given their preferences for content delivery 105. The selected assets may be sent by the asset portfolio manager to the receiving device, or a display screen, web page, etc., may be created that includes the selected assets and the assets that are to be displayed online during the online engagement 105. Alternatively, the asset portfolio manager may display a presentation screen template to an administrator and suggest the placement of each of the selected assets within the presentation screen template. The administrator may indicate the placement of each selected asset and instruct the asset portfolio manager to send the completed presentation screen to a receiving device. In an embodiment, the selected assets may be homogeneous in nature, e.g., video only, etc. In another embodiment, the selected assets may be heterogeneous and may comprise any combination of: text, video, hyperlinks, images, audio, etc. To meet this need, the system performs several features:

1. Definition of an anchor asset—one that may be presented with certainty during the online engagement
2. Selection of assets for co-presentation that can be simultaneously delivered in the same user engagement session
3. Consideration of the user's human sense(s) to which the asset portfolio manager wishes to be present in the online environment
4. Selection of assets for presentation that remain fixed or may vary during the engagement (such as a fixed image or a video) according to the asset manager's choice
5. Enforcement of a rule set that ensures the probability of the selection of assets to vary based on the preferences of the asset portfolio manager and physical constraints on the display device
6. An automated system that, given the constraints and preferences set by the asset portfolio manager, selects an ensemble of assets for co-presentation that share a similar theme
7. A mechanism for down-weighting an asset so that it has a reduced chance of being selected for display
8. A process by which various presentation alternatives (in terms of the number and type of assets, the similarity among the assets, and the physical layout of the presentation of assets in an online environment) can be explored and measured to determine the presentation format that yields the most value to the user.

One application of an embodiment can be found in the online news publishing industry. For any given asset (e.g., textual, such as a news article, etc.) that can be presented on a web page, there may arise the desire of the asset portfolio manager 101 to also co-present relevant images, videos, sound clips, and hyperlinks to related articles to provide additional information in a variety of format with the intent of improving the satisfaction associated with the consumer's engagement with the content. Referring to FIG. 2, an example of a presentation of multimedia assets 200 is shown where a news article 201 (a text asset) is shown in the center of a display and accompanied by a variety of assets 202 (audio, image, video, advertisements, links to other articles, etc.) in the ensemble. A successful presentation would deliver appropriate assets that consider the user's various sensory modes to which the asset portfolio manager 101 wishes to appeal (e.g., given predetermined limits on content and the physical constraints on the display device, etc.) while ensuring the ensemble of presented assets is, as a group, relevant to the article that has been selected to be displayed with certainty (the anchor asset).

An embodiment displays or creates a display of video asset recommendations to users engaging a variety of online websites using mobile and non-mobile electronic data providers. The system:

a. Creates recommendations to a user based on an asset (e.g., video, audio, text, etc.) library
b. Ensures that content in an asset (e.g., video, audio, text, etc.) portfolio is monetized
c. Delivers analytics to learn the most valuable content in a client's video library, for example.
d. By operating as a supply-side platform (SSP) for online video, the system utilizes data to increase engagement and provide solutions to assure that advertisements are delivered and advertisement rates are optimized.

Inputs: The inputs to the system may be:

$L_t$ is the physical arrangement of assets in presentation t limited by the display parameters of the presentation device, such as the physical characteristics of the presentation device and the embedded software that enables certain asset types to be consumed (for example, presentation of a video file in the layout may require that there exists a capability for the video to be played, if desired by the user during engagement). FIG. 2, shown earlier, is an example of a possible physical arrangement of assets.

A is the set of portfolio assets available for selection and subsequent display. Individual asset $a_i$ is the $i^{th}$ asset among n assets: $A=\{a_1, a_2, \ldots, a_n\}$ $a_i$ is the anchor asset that can be presented with certainty and that is capable of being presented given the physical characteristics and the other limitations of $L_t$.

$A^{(-i)}$ is the remainder of the portfolio assets that may be selected for co-presentation along with the anchor asset, $a_i$: $A = A^{(-i)} \cup a_i$, $A^{(-i)} \cap a_i = \emptyset$ X is a set of k features describing each of the n assets.

$X = \{x_1, x_2, \ldots, x_n\}$ where $x_i = \{x_{i,1}, x_{i,1}, \ldots, x_{i,k}\}$.

$\tau_{i,c}$ is a subset of a feature of asset $a_i$ referred to as a collection descriptor which is a label or index indicating a theme under which the asset is grouped (e.g., sports, entertainment, justice, etc.). An asset $a_i$ may belong to $c \geq 1$ asset groups so that $\tau_i = \{\tau_{i,1}, \tau_{i,2}, \ldots, \tau_{i,c}\}$. Additionally, more refined theme division may exist describing a physical locale and more detailed membership requirements. For simplicity, each distinct collection label, sub-collection criteria and locale can be uniquely identified using a collectionID as shown in Table 1. Note that the entry corresponding to collectionID=3 has a locale of "Worldwide" which is equivalent to describing an asset whose relevance is without geographic limits.

$ssfID_i$ is a single feature of asset $a_i$ indicating three characteristics of the asset; the human sensory mode to which it appeals, whether the asset is stationary or non-stationary, and a description of the asset type. Table 2 gives an example of some instances of various ssfIDs where the plurality of ssfIDs has a size of P.

TABLE 1

CollectionID Example Encompassing Distinct Locale/Theme Combinations

| collectionID | collectionLabel | collectionDetail | Locale |
|---|---|---|---|
| 1 | Sports | Football | United States |
| 2 | Sports | Soccer | Europe |
| 3 | Politics | Congress | United States |
| 4 | Entertainment | Celebrities | Worldwide |
| 5 | Entertainment | Movie Reviews | United States |
| 6 | Justice | Crime | Illinois USA |
| 7 | Justice | Legislation | Illinois USA |
| ... | ... | ... | ... |
| C | ... | ... | ... |

TABLE 2 ssfID Examples Describing Distinct Sense/Stationarity/Description Triplets

| ssfID | Sense | is Stationary | fileType |
|---|---|---|---|
| 1 | Slight | Yes | Image |
| 2 | Slight | No | Map |
| 3 | Slight | No | Animated GIF |
| 4 | Slight | No | Video |
| ... | Slight | ... | ... |
|  | Sound | Yes | Tone |
|  | Sound | No | Music |
|  | Sound | No | Audio Clip |
|  | Sound | ... | ... |
| P | ... | ... | ... |

$\kappa_{i,c}$ is a text-based subset of a feature of asset $a_i$ referred to as a keyword list which is set of labels describing asset $a_i$. Asset ai $a_i$ may have $w \geq 0$ keywords so that $\kappa_i = \{\kappa_{i,1}, \kappa_{i,2}, \ldots, \kappa_{i,w}\}$. Keywords may be in any language and contain special characters and symbols.

$FileTypeID_i$ is the type of file (based on the file extension associated with asset paired with a ssfID). Examples of various file types that may be associated with each distinct ssfID are shown as a many-to-one relationship in Table 3. Included in this table is a value for each row called additiveValue (always greater than or equal to 0) that can be used to induce a preference for certain file types sharing the same ssfID.

Larger values associated with additiveValue increase the chances that, among all files selected for co-presentation with the anchor asset $a_i$, the file having the specified type will be selected.

TABLE 3

File Types Associated with Various ssfIDs

| FileTypeID | ssfID | fileExtension | additiveValue |
|---|---|---|---|
| 1 | 1 | GIF | 3 |
| 2 | 1 | TIFF | 2 |
| 3 | 1 | JPG | 1 |
| 4 | 1 | JPEG | 1 |
| 5 | 2 | KML | 1 |
| 6 | 3 | GIF | 1 |
| 7 | 4 | MP4 | 1 |
| ... | ... | ... | ... |
| f |  |  |  |

$x_i$ as described earlier contains k features describing asset $a_i$; $x_i = \{x_{i,1}, x_{i,1}, \ldots, x_{i,k}\}$ representing the asset's;
1) collectionID list, $\tau_i$
2) distinct sense/stationarity/description triplet denoted by $ssfID_i$ 3) keyword list, $\kappa_i$ 4) All of the remaining k−3 features describing asset $a_i$.

An example of the n×k table use to store the various sets of k features for each of the n assets in A is shown in Table 4. In addition to the k features, the stored table may include an assetID i=1, . . . , n along with a FileTypeID.

TABLE 4 k-dimensional Feature Set for n Assets

| Asset | FileTypeID | collectionID(s) | ssfID | Keywords | field_4 | field_5 | ... | field_k |
|---|---|---|---|---|---|---|---|---|
| 1 | 4 | 1.4 | 1 | New England Patriots, Tom Brady, AFC, Touchdown | | | | |
| 2 | 4 | 1 | 1 | Jacksonville Jaguars, Jordan Todman, Kickoffreturn | | | | |
| 3 | 1 | 4 | 3 | Humphrey Bogart, Caseblance, Oscar Award | | | | |
| ... | ... | ... | | | | | | |
| n | | | | | | | | |

$s_{i,j}$ is a computed similarity between asset $a_i$ and asset $a_j$ based on pairwise difference between the features of the two assets, not including the collectionID(s), ssfID, or keyword(s). The computation of this pairwise similarity may represent a more complex metric that is employed by the underlying recommendation engine at the disposal of the asset portfolio manager. In this example, a simple Minkowski metric (a computation of pairwise differences between asset $a_i$ and itself represented by $s_{i,i}$ typically yields a value of 1 (after standardization) and the matrix S is symmetric and non-negative for all i,j) is discussed that may be applied after all of the features have been standardized to a [0,1] scale.

$$s_{i,j} = 1 - \left\{\sum_{m=1}^{k} w_m (x_{i,m} - x_{j,m})^\gamma\right\}^{1/\gamma} \quad 0 \le w_m \le 1, \sum_{m=1}^{k} w_m, \gamma > 0$$

The n×n matrix of pairwise similarities may be computed (independent of the ssfID, FileTypeID, and collectionIDs) in order for the co-presentation process to be employed. FIG. 3 illustrates the identification of similarities between pairs of assets.

The computed pairwise similarities may then be represented as:

$$S = \begin{bmatrix} 1 & s_{1,2} & \cdots & s_{1,n-1} & s_{1,n} \\ s_{2,1} & 1 & \cdots & s_{2,n-1} & s_{2,n} \\ \cdots & \cdots & \cdots & \cdots & \cdots \\ s_{n-1,1} & s_{n-1,2} & \cdots & 1 & s_{n-1,n} \\ s_{n,1} & s_{n,2} & \cdots & s_{n,n-1} & 1 \end{bmatrix}$$

To illustrate how the similarities are computed, FIGS. 4-9 provide an example of three assets $\{a_i, a_j, a_k\}$ and the observed k=3 features values for each asset. FIG. 4 shows the values of the assets. FIGS. 5-7 show the absolute values of pairwise differences among the three assets $\{a_i, a_j, a_k\}$ in the example data for features 1, 2, and 3, respectively. Using an exponent $\gamma=1$ and weights of $w=\{w_1, w_2, w_3\}=\{0.40, 0.30, 0.10\}$ for features 1, 2, and 3, respectively, then FIG. 8 shows the composite weighted values of the three features for each pair of assets. From these values, the composite similarities for the example set of assets is shown in FIG. 9.

$\alpha_{i,j}$ a multiplier selected by the asset portfolio manager indicating if certain pairings of assets should have a reduced chance of being co-presented where $0 \le \alpha_{i,j} < 1$ and, for any pair i,j not defined, it is assumed that $\alpha_{i,j}=1$. Table 5 provides an example of some pairs of assets for which co-presentation is discouraged and for any value for which $\alpha_{i,j}=0$, co-presentation may not be allowed.

TABLE 5

Down-weighting of Asset Pairs

| i | j | $\alpha_{i,j}$ |
|---|---|---|
| 1 | 2 | 0.00 |
| 1 | 4 | 0.10 |
| 3 | 1 | 0.12 |
| 4 | 2 | 0.58 |
| ... | ... | ... |
| q | ... | ... |

The pairwise similarity matrix S along with Tables 1-5 represent the schema that can be used to build an ensemble of assets for presentation—given $a_i$ (the anchor asset)—once the asset portfolio manager has designed the physical arrangement of asset for presentation, $L_f$.

2.0 Methodology

Figure 10:
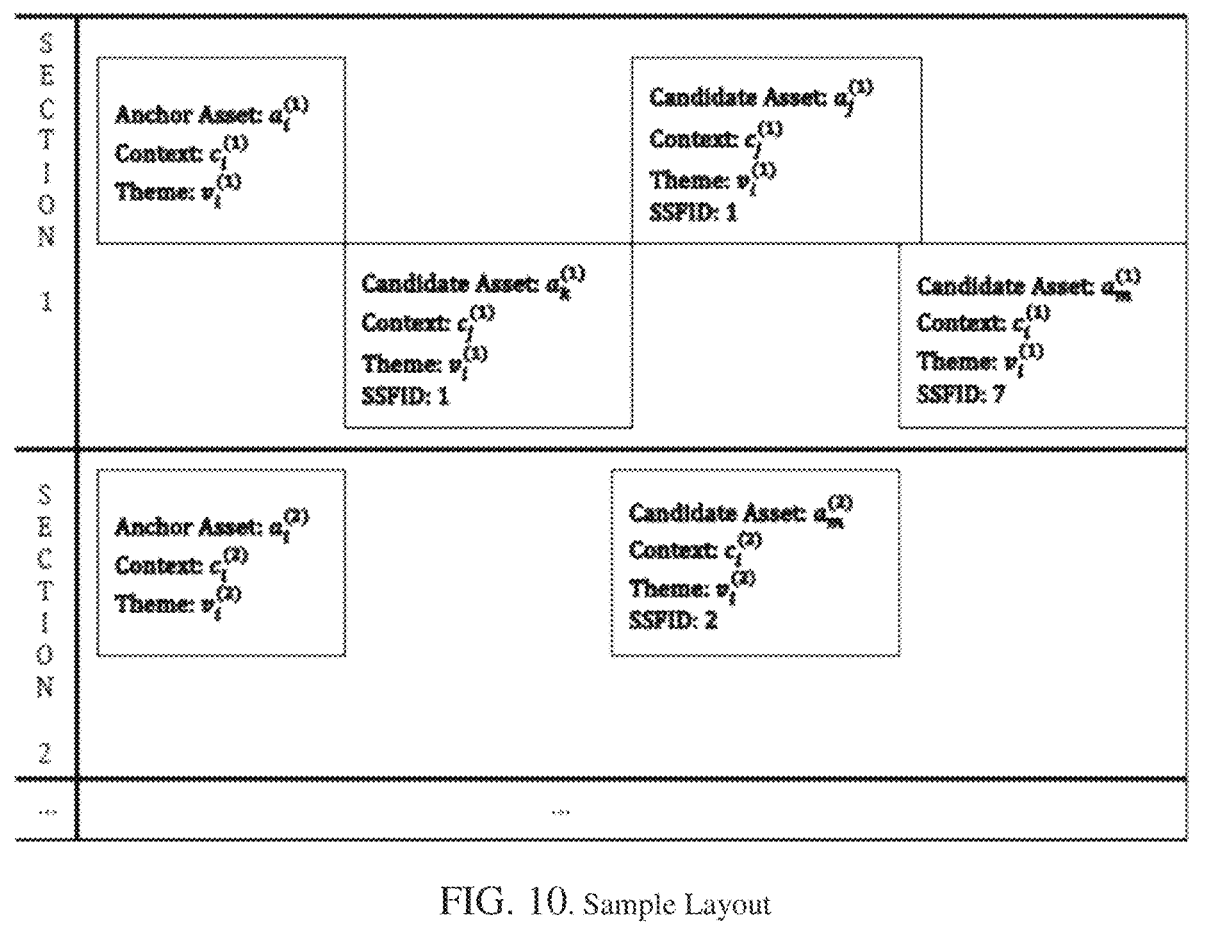

With all of the inputs in place, the item portfolio manager may design the layout $L_f$ and the underlying computations associated with an embodiment can be executed to automatically populate the presentation. FIG. 10 illustrates a sample layout, $L_o$, which considers the physical layout of the presentation space available given the physical constraints of the device used to present the selected assets. Note that the layout region, B, can be subdivided in d=1, . . . , D sections, each having an anchor asset, $a_i^{(d)}$. In each of the D sections, the item portfolio manager may then identify the particular ssfID and position where they would like to place each asset to be co-presented. In each slot r=1, . . . , $R^{(d)}$—the position where an asset is to be placed in a section of the presentation—an ssfID is defined by the asset portfolio manager.

2.1 Ensemble Strength

Within a section d, the entire set of co-presented assets in the $R_d$ can be called an ensemble, $$E_d = \{a_i^{(d)}, a_j^{(d)}, \ldots, a_R^{(d)}\}.$$

In an embodiment, there may be four levels of ensemble strength:

1) Weak Ensemble: within a section d, the selection for assets to be included for co-presentation are based on similarities among every candidate asset in $A^{(-i)}$ and the anchor asset, $a_i$. At most, the number of pairwise comparisons of eligible assets that needs to be completed is n−1 and so this a highly computationally efficient approach to building an ensemble but may lead to solutions where the elements selected from $A^{(-i)}$ are not very similar to each other.

2) Strong Ensemble: within a section d, the selection for assets to be included for co-presentation are based not only on similarities among every candidate asset in $A^{(-i)}$ and the anchor asset, $a_i$, but also every other candidate asset in $A^{(-i)}$. If there are $n_r^{(d)}$ eligible candidate assets to fill slot r in section d, then the maximum number of possible solutions to the problem of selecting the $r=1, \ldots, R_d$ assets (disallowing duplication of the same asset within a section) is:

$$N_d = \frac{(n-1)!}{(n-R_d-1)!}.$$

Note that, as n grows large, $N_d \to \infty$, making the strong ensemble method computationally intractable in many cases.

3) Semi-strong Ensemble: Since the semi-strong ensemble is computationally costly and the weak ensemble may result in a solution where the assets from $A^{(-i)}$ that are chosen for co-presentation with $a_i$ are dissimilar, a compromise solution is offered. Construction of a semi-strong ensemble is done iteratively over each of the $r=1, \ldots, R_d$ slots in a section d. In the initial asset selection the first slot (r=1) is filled with an asset, $a_j$, that is selected based on its similarity with $a_i$. In the next step, slot r=2 is filled with asset $a_k$ based on its similarity with both $a_i$ and $a_j$. This process repeats over the $R_d$ slots, each time comparing candidate assets to those that have been selected for inclusion in the section in previous iterations. Essentially, the ensemble is "backward-looking" and adds an asset to a slot based on the similarities with all assets in slots that have already been filled—but does not consider the similarities of assets that may be added in the filling of future slots. For small values of $R_d$ and n, it is possible that the strong, semi-strong, and weak ensembles may be identical, though such an outcome is not expected. However, the upper bound on the total number of required comparisons for a given section d is no greater than $$\frac{nR_d(R_d+1)}{2},$$

a lesser computational burden (for larger n) than required build a strong ensemble.

4) Improved Semi-strong Ensemble: After a semi-strong ensemble is built, a second round of iterations can be applied that seek to find improvements to the objective function. This is, of course, more computationally costly than the semi-strong ensemble method, but the additional cost is proportional to (n'−2D) additional computations where n' is the total number of slots to be filled in the display $L_t$ and D is the total number of sections. The option to pursue an improved ensemble using this construction method can be considered by the asset portfolio manager based on a comparison of the tradeoff between a desire to seek a solution that is: a) more consistent with a final layout that may be achieved using the strong ensemble method; and b) does not add an unacceptable computational burden.

2.2 Ensemble Duplication

Within an ensemble, a requirement prohibiting or allowing duplicate assets within or across a section can also be defined. Where there always exists the requirement that the candidate assets for inclusion in the presentation of a section-level set of assets not duplicate the anchor asset $a_i$—that is $A = A^{(-i)} \cup a_i$, $A^{(-i)} \cap a_i = \emptyset$—duplication may be allowed among the other non-anchor assets in the presentation of section d.

1. When local duplication is prohibited, no two assets within a section d may be the same.
2. When global duplication is prohibited, no two assets within a section d may be the same nor may any two assets across the $d=1, \ldots, D$ sections be allowed in the layout, $L_t$.

2.3 Ensemble Depth

Another consideration when building an ensemble is the degree to which the similarities among the assets in the $d=1, \ldots, D$ sections should be. The enforcement of similarity across sections in a layout $L_t$ as the depth—depth can either be local or global. If the ensemble depth is local, then there is no requirement that the similarities across assets presented in different sections be considered in the selection of assets of $L_t$. If the depth is global, pairwise comparisons of assets are computed both within a section d and across all sections $d=1, \ldots, D$. Notationally, the similarities among assets is $s_{i,j}$, but when further transformations are applied to adjust for commonality among keywords, file types, and enforce ssfID and down-weighting requirements, then similarities in section d among two its members, $a^{(d)}_i$ and $a^{(d)}_j$, can be denoted by $f^{(d)}_{i,j}$ and the vector of assets selected for presentation in section d is:

$$a^{(d)} = \{a_i^{(d)}, a_j^{(d)}, \ldots, a_{R_d}^{(d)}\}.$$

The application of depth may be accomplished by taking an overall representative of similarities of assets with a section d and the overall similarity of assets across the various sections $d=1, \ldots, D$. Let;

$$w^{(d)} = \begin{cases} \min_j f_{i,j}^{(d)} & \text{if weak ensembles are desired } j=1 \ldots R_d, i \neq j \\ \min_{j,k} f_{j,k}^{(d)} & \text{otherwise } j, k=1 \ldots R_d, j \neq k \end{cases}$$

$$b^{(d)} = \begin{cases} \min_j \left(f_{i,j}^{(d)}, f_{i,j}^{(g)}\right) & \text{if weak ensembles are desired } j=1 \ldots R_d, i \neq j, g \neq d \\ \min_{j,k} f_{j,k}^{(d)}, f_{j,k}^{(g)} & \text{otherwise } j, k=1 \ldots R_d, j \neq k, g \neq d \end{cases}$$

and let the measure of depth across all $d=1, \ldots, D$ sections in $L_t$ be $$m(L_t) = w^{(d)} + \lambda_r b^{(d)} \text{ where } 0 \leq \lambda_r \leq 1. \quad \{\text{Equation 1}\}$$

Selection of assets for presentation within a layout, $L_t$, is then equivalent to maximizing $m(L_t)$;

$$\lambda_t = \begin{cases} 0 & \text{when local depth is desired} \\ 1 & \text{when global depth is desired} \end{cases}.$$

2.4 Construction of Ensembles

In this section, the mechanics of the construction of weak, strong, and semi-strong ensembles is presented along with the steps to apply local or global duplication prohibition and local/global depth restrictions. Among all three methods of constructing ensembles, there are common steps to prepare the similarity matrix based on the availability of theme and keyword features possessed by each asset along with the down-weighting of certain asset pairs made to discourage co-presentation in a display.

2.4.1 Similarity Matrix Preparation for Ensemble Construction

Step 1a: each element in the diagonal of matrix S is set equal 0 to yield a matrix of similarities;

$$S = \begin{bmatrix} 0 & s_{1,2} & \cdots & s_{1,n-1} & s_{1,n} \\ s_{2,1} & 0 & \cdots & s_{2,n-1} & s_{2,n} \\ \cdots & \cdots & \cdots & \cdots & \cdots \\ s_{n-1,1} & s_{n-1,2} & \cdots & 0 & s_{n-1,n} \\ s_{n,1} & s_{n,2} & \cdots & s_{n,n-1} & 0 \end{bmatrix}$$

This is equivalent to defining $A^{(-i)}$ since asset $a_i$ has been removed from the set of candidate assets for co-display (avoiding duplication of the anchor asset) since one requirement for selection will be that the similarity value, $s_{i,j}$, of a selected item $a_j$ to be paired with the anchor asset, $a_j$, is that $s_{i,j} > 0$.

Step 1b: Identify entries in Table 5 to allow adjustment for the chance of being selected (lower values of $s_{i,j}$ reduce the chances of selection for presentation). Undefined pairs for any i,j receive a value of $\alpha_{i,j}=1$.

Step 1c: For each pair of assets $\{a_i, a_j\}$ of A (i,j=1, ..., n) a multiplier, $\delta_{i,j}$, is computed;

$$\delta_{i,j} = \frac{w_i \cap w_j}{\max(w_i, w_j)} \quad 0 \le \delta_{i,j} \le 1$$

where $w_i$ is the number of keywords associated with $a_i$, $w_j$ is the number of keywords associated with $a_j$, and $w_i \cap w_j$ is the number of keywords the two assets have in common.

Step 1d: For each pair of assets $\{a_i, a_j\}$ of A (i,j=1, ..., n) a multiplier, $v_{j,k}$, is computed;

$$v_{i,j} = \begin{cases} 1 & \text{if asset } i \text{ shares a } collectionID \text{ with asset } j \\ \epsilon_v & \text{otherwise} \end{cases} \quad \epsilon_v \ge 0.$$

Step 2: Update the values of S by multiplying against the values computed in Step 1a-1c to adjust the similarities based on the relative concordance of keywords (lower concordance reduces the chances of selection for presentation), consistency of themes, and:

$$s'_{i,j} = s_{i,j} \times \delta_{i,j} \times v_{i,j} \times \alpha_{i,j}$$

The similarity matrix prepared for ensemble construction in then an adjusted n×n symmetric matrix, S', representing all pair of assets $\{a_i, a_j\}$ of A (i,j=1, ..., n).

$$S' = \begin{bmatrix} 0 & s'_{1,2} & \cdots & s'_{1,n-1} & s'_{1,n} \\ s'_{2,1} & 0 & \cdots & s'_{2,n-1} & s'_{2,n} \\ \cdots & \cdots & \cdots & \cdots & \cdots \\ s'_{n-1,1} & s'_{n-1,2} & \cdots & 0 & s'_{n-1,n} \\ s'_{n,1} & s'_{n,2} & \cdots & s'_{n,n-1} & 0 \end{bmatrix}$$

FIG. 11 depicts an example of how the adjusted similarity matrix is computed, specifically showing the process for two pairs of example assets $\{a_1, a_4\}$ and $\{a_1, a_7\}$.

Step 3: For each element section d, slot r, and element $s'_{i,j}$ of S', three sub-steps are executed:

Step 3.a: a multiplier is computed, $\phi_j^{(d,r)}$, as $$\phi_j^{(d,r)} = \begin{cases} 1 & \text{if } a_j \text{ has the } ssfID \text{ required for slot } r, \text{ section } d \\ 0 & \text{otherwise} \end{cases}$$

This step forces the asset selection process to prefer those assets that are consistent with the sense/stationarity/fileType specified by the asset portfolio manager. Setting a value of $\epsilon_\phi > 0$ for non-matched ssfID values is a possible less-strict option that can be employed to allow a selection not exactly specified by the asset portfolio manager.

Step 3.b: the additive Value, $\rho_j$, is extracted from Table 3 (the various file types associated with each ssfID) for each asset S' based on a lookup of the fileTypeID found in Table 4 (the features of each asset including the file type). the purpose of this sub-step is to adjust the similarity values to prefer, among all assets that remain eligible for selection, the asset having the desired file type. FIG. 12 shows an example of how the ssfID and fileTypeIDs required for a slot r and section d are computed—matches are shown for eligible candidates for section 1

Step 3.c: Compute a final set of similarity pair for each section d each slot r as:

$$f_{i,j}^{(d,r)} = s'_{i,j} \times \phi_{i,j}^{(d,r)} \times (1 + \rho_j^{(d,r)})$$

Step 4: Among all similarity matrices, $f_{j,k}^{(d,r)}$ where d=1, ... D and r=1, ..., $R_d$, select the values such that $f_{j,k}^{(d,r)} > 0$ as initial candidates for that slot r and section d. To be eligible to fill a slot in section d, an asset $a_j^{(d)}$, can have a non-zero similarity value ($s'_{i,j} > 0$) when paired with the anchor asset $a_i^{(d)}$ in that section. Note that it is disallowed for another asset to populate the slot(s) reserved for the anchor asset in each section.

The resulting candidate list may then be used to create a table $F_t$ containing a list of possible assets that may be used to populate the display $L_t$ for all sections d=1, ..., D and their respective slots r=1, ..., $R_d$.

An example table $F_t$ from preparation of the similarities is shown in Table 6. In the example, section d=1 has $R_d$=2 slots; one is reserved for the anchor asset ($a_1$ and $a_2$) and eligible anchor assets are based on the example in FIG. 12. while the second slot may be filled with one of two assets $\{a_4$ or $a_7\}$. The implication is that the similarities of the candidates in the second slot of section d=1 have values that can be used to select an appropriate asset to pair with the anchor asset for section d=1 and slot r=2 given that the anchor asset is selected.

Following through with the examples in FIGS. 9-11 and Table 6, the value of pairwise

TABLE 6

Example Candidate Assets after Preparation for Ensemble Construction

| Section (d) | slot(r) | Eligible Asset (j) | ssfID Multiplier $\rho(d, r)$ | additive Value $\rho(d, r)$ |
|---|---|---|---|---|
| 1 | 1 | 1 | 1 | 0.10 |
| 1 | 1 | 2 | 1 | 0.10 |
| 1 | 2 | 4 | 1 | 0.05 |
| 1 | 2 | 7 | 1 | 0.01 |
| 2 | 1 | 5 | 1 | 0.10 |
| 2 | 1 | 6 | 1 | 0.10 |
| 2 | 2 | 5 | 1 | 0.15 |
| 2 | 2 | 6 | 1 | 0.08 |
| 2 | 3 | 5 | 1 | 0.10 |
| 2 | 3 | 6 | 1 | 0.01 |
| 2 | 4 | 5 | 1 | 0.10 |
| 2 | 4 | 6 | 1 | 0.01 | similarities, $f_{i,j}^{(d,r)} = s'_{i,j} \times \phi_{i,j}^{(d,r)} \times (1+\rho_j^{(d,r)})$, used to fill position r=2 assuming the $a_1$ is selected as the anchor asset for section d=1 are (refer to FIG. 10 for the adjusted similarities):

$$f_{1,4}^{(1,2)} = s'_{1,4} \times f^{(1,2)}_{1,4} \times \rho_4^{(1,2)} = 0 \times 1 \times (1+0.05) = 0 \text{ and}$$

$$f_{1,7}^{(1,2)} = s'_{1,7} \times f^{(1,2)}_{1,7} \times \rho_7^{(1,2)} = s1,7 \times 0.2 \times 1 \times (1+0.01) = s_{1,7} \times 0.202$$

2.4.2 Weak Ensemble Construction

In an embodiment, after $L_t$ has been defined, the automated process for selecting assets for co-presentation of a weak ensemble works as follows for each of the D sections:

Step 1: Given the desired choice of duplication restrictions (local or global), identify the set of all possible and allowable arrangements, $a^{(d)}$, of assets from A that can be used to populate the display, $L_t$, under the restriction that the anchor assets and their positioning in each section, $a^{(d)}_t$, is required.

Step 2. Select a*, the unique arrangement of a that maximizes $m(L_t) = w^{(d)}$ as defined earlier by Equation 1 which is equivalent to, for each slot, choosing the eligible candidate asset $a_j$ for which the similarity between it and the section's anchor asset $a_t^{(d)}$ is maximized (Note that in the weak ensemble method, a global depth restriction may not be sensible). The arrangement of assets selected as a* are then used to populate the display and can guarantee that every asset selected for presentation in section d has a non-zero similarity with the anchor asset in the section (local depth). In the example discussed above, earlier, if $a_1$ is selected as the anchor asset and another asset meeting the ssfID and fileTypeID restrictions are applied to slot r=2 and section d=1, then only assets $a_4$ or $a_7$ can be selected to fill the position. Since $a_7$ has a larger value (0.202×$s_{1,7}$ assuming that $s_{1,7}$>0) for the final similarity computation $f^{(1,2)}_{1,j}$ than asset $a_4$ when paired with asset a=$_1$, then it would be chosen to fill the d=1, r=2 position in the display.

2.4.3 Strong Ensemble Construction

In an embodiment, after $L_t$ has been defined, the automated process for selecting assets for co-presentation of a strong ensemble works as follows for each of the d=1, . . . , D sections:

Step 1: Given the desired choice of duplication restrictions (local or global), identify the set of all possible and allowable arrangements, $a^{(d)}$, of assets from A that can be used to populate the display, $L_t$, under the restriction that the anchor assets and their positioning in each section, $a^{(d)}_t$, is required.

Step 2: Some possible arrangements of $a^{(d)}$ are removed from eligibility as an acceptable solution for populating layout $L_t$. Any arrangement containing a pair of assets such that the similarity $f^{(d)}_{j,k}=0$ (j,k=1, . . . , n) within a section d is removed. This is equivalent to enforcing the restriction that an eligible asset need to not only have a non-zero similarity with the anchor asset, but also to every other asset that may be co-displayed in the same section (Since this step may result in an empty set of solutions, non-zero choices for $\varepsilon_\delta$, $\varepsilon_\phi$ and $\alpha_{i,j}$ can be set to small-but-positive values to ensure that some possible arrangements are available, albeit sub-optimal). For example, if $a_i$ is selected as the anchor asset for a display with r=3 assets, then the other two assets, $a_j$ and $a_k$, selected to fill the other positions must not only be similar to $a_i$, but must be similar to each other—that is, consideration must be given to the similarities among $\{a_i, a_j\}$, $\{a_i, a_k\}$ and $\{a_j, a_k\}$.

Step 3: If a global depth restriction is desired, then some possible arrangements of $a^{(d)}$ are removed from eligibility to be an acceptable solution for populating layout $L_t$. Any arrangement containing a pair of assets such that the similarity $f^{(d)}_{j,k}=0$ (j,k=1, . . . , n) is removed. This is equivalent to enforcing the restriction that an eligible asset need to not only have a non-zero similarity with the anchor asset, but also to every other asset that will be co-displayed across all sections d=1, . . . D.

Step 4: For each, select a*, the unique arrangement of a that maximizes $m(L_t) = w^{(d)} + \lambda_t b^{(d)}$ given the desired depth (via appropriate selection of $\lambda$).

The arrangement of assets selected as a* may then be used to populate the display and can guarantee that every pair of assets within a section d has a non-zero similarity with every other asset selected for co-display in the section (local depth). If a global depth restriction is applied, then there will be an additional guarantee that every pair of assets within the display $L_t$ has a non-zero similarity with every other asset selected for co-display in the display.

2.4.4 Semi-Strong Ensemble Construction

In an embodiment, after $L_o$ has been defined, the automated process for selecting assets for co-presentation of a semi-strong ensemble can be executed. The semi-strong approach is performed iteratively to strike a compromise between the weak and strong ensemble approaches in terms of computational efficiency. The key difference in this approach relative to the other ensemble-building steps is that the final arrangement of assets, a*, is not necessarily the optimal one (that would be selected using all possible arrangements of eligible assets using the strong ensemble approach) but rather seeks to iteratively find the best asset for display given all assets chosen in earlier iterations.

Step 1: Some possible elements of $a^{(d)}$ are removed from eligibility as an acceptable solution for populating layout $L_t$. Any element of $F_t$ containing a pair of assets such that the similarity $f^{(d)}_{j,k}=0$ (j,k=1, . . . , n) within a section d is removed. This is equivalent to enforcing the restriction that an eligible asset need to not only have a non-zero similarity with the anchor asset, but also to every other asset that will be co-displayed in the same section (Since this step may result in an empty set of solutions, non-zero choices for $\varepsilon_\delta$, $\varepsilon_\phi$ and $\alpha_{i,j}$ can be set to small-but-positive values to ensure that some possible arrangements are available, albeit sub-optimal).

Step 2: If a global depth restriction is desired, then some elements of $a^{(d)}$ are removed from eligibility to be an acceptable solution for populating layout $L_t$. Any element of $F_t$ containing a pair of assets such that the similarity $f^{(d)}_{j,k}=0$ (j,k=1, ..., n) is removed. This is equivalent to enforcing the restriction that an eligible asset need to not only have a non-zero similarity with the anchor asset, but also to every other asset that will be co-displayed across all sections d=1 ..., D.

Step 3: Among remaining elements of $F_t$ that remain, select a*, the unique arrangement of a that maximizes the objective function $m(L_t)$ is computed. In sequential order, iterate over each section d=1, ..., D and each slot within a section r=1, ..., $R_d$—skipping over each anchor asset $a_i^{(d)}$ since its slot choice is predetermined and set by $L_t$ as follows:

Step 3a: To yield an ordered vector of similarities representing the assets that may be placed in the current (the $r^{th}$) position of section d, select the asset $a_j^{(d,r)}$ eligible to be placed in that position (based on $F_t$) such that the similarity between that asset and all other assets previously identified to fill slots in the iterative process is non-zero. Additionally, among the assets with non-zero similarities and with local depth, compute $$w^{(d)} = \min_{j,k} f^{(d)}_{j,k} j, k = 1 \ldots (r-1), j \neq k$$

and, for the $a^{(d,r)}$ element of a*, choose the value which maximizes $w^{(d)}$ for which duplicates have been omitted according to the local or global choice made for duplicate values.

Step 3b: If global depth is required, also compute:

$$b^{(d)} = \min\{f_{j,k}^{(d)} f_{j,k}^{(g)}\} j,k=1 \ldots (r-1) \cup \{a_i^{(1)}, a_i^{(2)}, \ldots, a_i^{(D)}\}, j \neq k, g \leq d$$

and select the asset $a_j$ to fill slot r in section d with the asset that maximizes $$m(L_t) = w^{(d)} + \lambda_t b^{(d)} \text{ where } 0 \leq \lambda_t \leq 1$$

during the current iteration and taking into account all other assets that have been previously selected to join a* in previous iterations.

The arrangement of assets selected as a* are then used to populate the display and, though may not be the global optimum, are considered to be optimal at the time during the iterative process when each asset was selected. These steps also ensure that depth and duplication requirements are considered when choosing assets for inclusion in a*.

In an example of how the semi-strong example would work for a given section d where the number of slots $R_d$=3 the local depth approach is used so the objective within the section is to maximize the value of $m_t(L_t)$ in the section's ensemble. Initially, the first slot r=1 is populated with the anchor asset, $a_i$, so $a*^{(d,1)}=a_i$. Moving on to the next slot, r+1=2, the asset, $a_j$, is selected having the largest similarity to the asset in slot 1, $a*^{(d,1)}$. Once selected, the optimal set now contains $a*^{(d)}=\{a_i,a_j\}$. In the next iteration, the selected asset, $a_k$, is the one taken over all candidates for which the smallest of similarities $f_{i,k}$, $f_{j,k}$ is maximized. That is, the measure of similarity of an asset consideration to join the optimal set, $a*^{(d)}$ is based on a comparison to all existing members of the set established in prior iterations.

2.4.5 Improved Semi-Strong Ensemble Construction

Knowing that the semi-strong ensemble construction might not be the optimal solution—through constructed optimization considered at each iteration over the d=1, ... D and r=1, ..., $R_d$ possible slot—it may be possible to review the results of the resulting semi-strong solution a* and seek improvements. To construct the improved semi-strong ensembles for the layout $L_t$, it is of course required that semi-strong iterations first be conducted and a* established. The improvement process is fairly simple and based on a second set of iterations over each section d=1, ..., D and each slot within a section r=1, ..., $R_d$—skipping over each anchor asset $a_i^{(d)}$ since their slot choice is predetermined and set by $L_t$—as follows:

Step 1: Define $a^{(-j)}$ as the optimal set, excluding the asset aj filling the (d,r)th position of a* "(corresponding to the current iteration);

$$a^{(-j)} \cap a* = \emptyset, a* = a*^{(-j)} \cup a*.$$

Step 2: Substitute another candidate asset $a_k \neq a_j$ that is eligible to fill the $a^{(d,r)}$ position of the optimal ensemble given duplicate and depth restrictions. Recompute:

$$m(L_t) = w^{(d)} + \lambda_t b(d) \text{ where } 0 \leq \lambda_t \leq 1$$

to obtain the value that would result from the substitution.

Step 3: If the objective function $m(L_t)$ is improved based on the substitution, replace the appropriate value of a* with the substitution.

The net result is that the final layout reflects a positioning and ensemble a* that yields a value of the objective function $m(L_t)$ that is the equivalent or more acceptable than the semi-strong ensemble that existed prior to the improvement process. Additionally, if substitutions do exist, the improvement process forces the final ensemble a* to be more similar to the one that would have existed if the computationally-costly strong ensemble method had been employed.

2.5 Layout Comparison

Although a single layout, $L_t$ has been discussed, embodiments can be used to evaluate the performance of various layouts and choices of depth, duplicate asset restrictions, and ensemble construction. In an online environment, the various inputs and asset portfolio manager choices may be varied to determine if an alternative to a single layout might be more effective. If the asset portfolio manager has a known and measurable performance metric in mind (for example, maximize revenue or engagement time), he/she may then use an embodiment to compare the performance of various presentation layouts/requirements in a multivariate or A/B testing environment to identify how various layouts might improve performance. If A is the asset library available to the portfolio manager, $L=\{L_0, L_1, \ldots, L_m\}$ and R is a set of rules encompassing the choice of ensemble strength, duplicates, and down-weighted asset pairs, and X is the depth parameter, then the item portfolio may evaluate $m(L_t|R_t, A, \lambda_t)$ for various combinations of $R_t$, $\lambda_t$ to determine the set of inputs that yields a maximum value of the performance metric.

It should be noted that the execution of this series of steps may be computed by a single actor (the asset portfolio manager) based at single physical location or multiple actors in single or multiple physical locations (FIG. 13).

An embodiment can use a version discussed above to maximize the objective function $m(L_t|R_t, A, \lambda_t)$ for any set of values. The embodiment can perform:

1) video recommendations in an ordered playlist (a single-section layout) having a fixed number of slots (as determined by the client). The system uses a single sense/stationarity combination (sight/non-stationary) and allows any video type that is playable by the client software. The system may prohibit global duplication, uses a global depth requirement, down-weights asset pairs probability of co-presentation using client-provided business rules, and employs the semi-strong ensemble-building method.

2) article-to-video layouts that take a text-based asset (a news article) as the anchor asset in each section and provides video recommendations in an ordered playlist (a single-section layout) having a fixed number of slots (as determined by the client) to accompany the text. The system uses a single sense/stationarity combination (sight/non-stationary) and allows any video type that is playable by the client software and selects video pairings that have the highest similarity to the anchor asset and other assets in the ensemble using the semi-strong ensemble approach.

3) Multivariate and A/B testing can be performed to determine if the weak ensemble and semi-strong ensemble methods yield similar results and, if so, using the weak ensemble method to minimize computational resources needed to support the presentation.

4) Recommendation engine—a recommendation engine can be implemented that determines how similarities are computed and feeds the ensemble-building.

5) Allows a continuous-play feature that seamlessly builds a sequential set of videos that may be viewed without interruption. The feature allows an entire video playlist to be constructed and consumed and, should user interaction suggest that a particular video asset consumption has terminated, present a revised list of recommended assets presented as an ensemble.

In an embodiment, an apparatus comprises a processor and is configured to perform any of the foregoing methods.

In an embodiment, a non-transitory computer readable storage medium, storing software instructions, which when executed by one or more processors cause performance of any of the foregoing methods.

Note that, although separate embodiments are discussed herein, any combination of embodiments and/or partial embodiments discussed herein may be combined to form further embodiments.

3.0. Example Embodiments

Examples of some embodiments are provided, without limitation, in the following paragraphs.

According to some embodiments, a method or non-transitory computer readable medium comprises: receiving a specification of an asset to be displayed during an online engagement; selecting a variety of assets related to the asset to be displayed during the online engagement, the variety of assets including any combination of: audio, video, text, or image, wherein the variety of assets are selected based on a relationship with the asset to be displayed during the online engagement; arranging the selected variety of assets into a single presentation screen; sending the presentation screen to a receiving device for display.

According to some embodiments, an apparatus comprises: a specification receiver that receives a specification of an asset to be displayed during an online engagement; an asset selector that selects a variety of assets related to the asset to be displayed during the online engagement, the variety of assets including any combination of: audio, video, text, or image, wherein the variety of assets are selected based on a relationship with the asset to be displayed during the online engagement; a presentation screen creator that arranges the selected variety of assets into a single presentation screen; a presentation screen sender that sends the presentation screen to a receiving device for display.

In some of the above embodiments, the single presentation screen is arranged using display parameters of the receiving device.

In some of the above embodiments, the variety of assets are selected based on a relationship between each asset among the variety of assets and the asset to be displayed during the online engagement.

In some of the above embodiments, each asset among the variety of assets is selected based on a relationship between the asset and the asset to be displayed during the online engagement, and wherein the asset is selected based on a relationship between the asset and all other assets in the variety of assets.

In some of the above embodiments, each asset among the variety of assets is selected based on a relationship between the asset and each asset among the variety of assets that was selected previous to the asset.

In some of the above embodiments, the asset to be displayed during the online engagement is textual.

In some of the above embodiments, the variety of assets are selected based on a common theme of the variety of assets.

In some of the above embodiments, each asset among the variety of assets is selected based on a variable probability.

In some of the above embodiments, at least a portion of the variety of assets are selected and arranged in the presentation screen based on human senses.

In some of the embodiments, the single presentation screen is arranged using display parameters of the receiving device.

In some of the above embodiments, the variety of assets are selected based on a relationship between each asset among the variety of assets and the asset to be displayed during the online engagement.

Other examples of these and other embodiments are found throughout this disclosure.

4.0 Implementation Mechanisms—Hardware Overview

According to an embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 14:
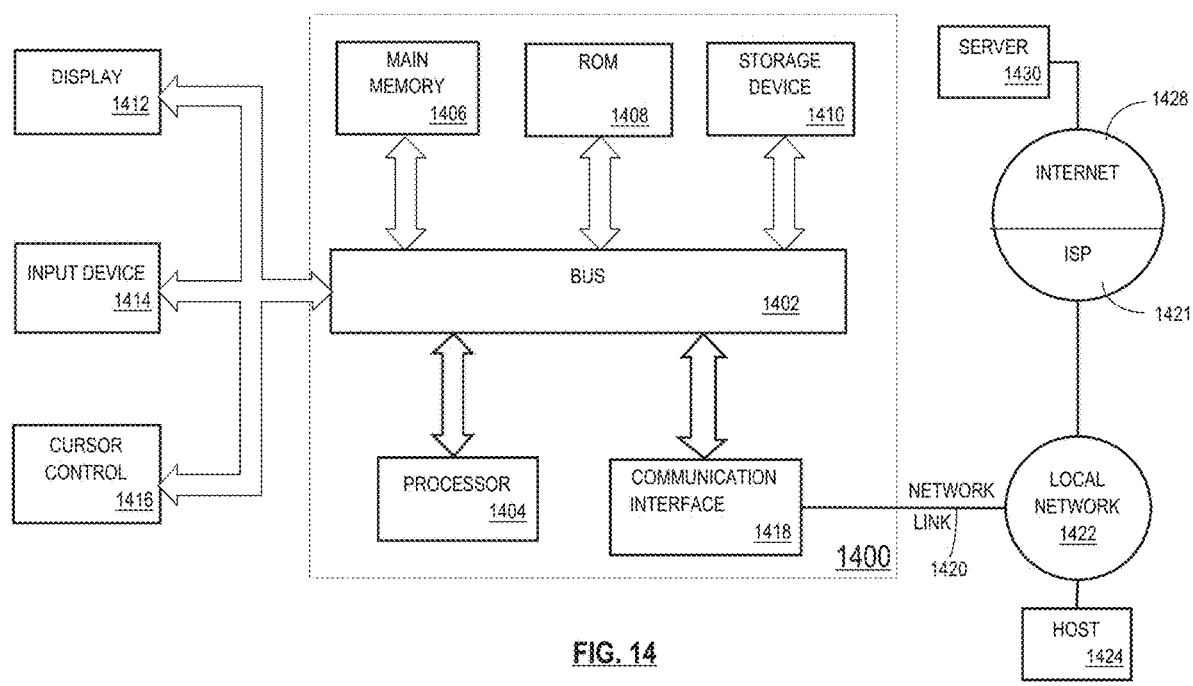
FIG. 14 illustrates a computer system upon which an embodiment may be implemented.

For example, FIG. 14 is a block diagram that illustrates a computer system 1400 upon which an embodiment may be implemented. Computer system 1400 includes a bus 1402 or other communication mechanism for communicating information, and a hardware processor 1404 coupled with bus 1402 for processing information. Hardware processor 1404 may be, for example, a general purpose microprocessor.

Computer system 1400 also includes a main memory 1406, such as a random access memory (RAM) or other dynamic storage device, coupled to bus 1402 for storing information and instructions to be executed by processor 1404. Main memory 1406 also may be used for storing temporary variables or other intermediate information during execution of instructions to be executed by processor 1404. Such instructions, when stored in non-transitory storage media accessible to processor 1404, render computer system 1400 into a special-purpose machine that is customized to perform the operations specified in the instructions.

Computer system 1400 further includes a read only memory (ROM) 1408 or other static storage device coupled to bus 1402 for storing static information and instructions for processor 1404. A storage device 1410, such as a magnetic disk, optical disk, or solid-state drive is provided and coupled to bus 1402 for storing information and instructions.

Computer system 1400 may be coupled via bus 1402 to a display 1412, such as a cathode ray tube (CRT), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane.

Computer system 1400 may implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor 1404 executing one or more sequences of one or more instructions contained in main memory 1406. Such instructions may be read into main memory 1406 from another storage medium, such as storage device 1410. Execution of the sequences of instructions contained in main memory 1406 causes processor 1404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1410. Volatile media includes dynamic memory, such as main memory 1406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or solid-state drive of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card, cable modem, satellite modem, or a modem to provide a data communication connection to a corresponding type of telephone line. As another example, communication interface 1418 may be a local area network (LAN) card to provide a data communication connection to a compatible LAN. Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are example forms of transmission media.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418.

The received code may be executed by processor 1404 as it is received, and/or stored in storage device 1410, or other non-volatile storage for later execution.

5.0 Extensions and Alternatives

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the embodiments, and what is intended by the applicants to be the scope of the embodiments, is the literal and equivalent scope of the set of claims that issue from this application, in the specific form in which such claims issue, including any subsequent correction.

What is claimed is:

1. A computer-implemented method comprising:

causing, by one or more processors of an electronic asset server system, a set of electronic assets among a plurality of electronic assets to be displayed to a user on a user device;

receiving, by the one or more processors of the electronic asset server system from the user device, user interaction data that indicates user interactions with the set of electronic assets;

determining, by the one or more processors of the electronic asset server system and based at least partially on the user interaction data, a termination of consumption of a particular electronic asset of the set of electronic assets;

upon the determination of the termination of consumption of the particular electronic asset:

selecting, by the one or more processors of the electronic asset server system and based at least in part on display parameters of the user device and a computer-implemented rule, an anchor electronic asset from the plurality of electronic assets, the anchor electronic asset is selected based on the display parameters of the user device such that the user device can present the anchor electronic asset to the user;

selecting, by the one or more processors of the electronic asset server system and selecting, by the one or more processors of the electronic asset server system and based at least in part on pairwise comparisons with one or more features of the selected anchor electronic asset, one or more additional electronic assets from the plurality of electronic assets related to the anchor electronic asset, wherein the one or more features of the selected anchor electronic asset include a specific feature identifying whether the selected anchor electronic asset is a video file, wherein a similarity matrix comprising matrix values generated from the pairwise comparisons is used to select the one or more additional electronic assets for co-displaying with the anchor electronic asset on an image display of the user device;

generating, by the one or more processors of the electronic asset server system, an electronic display page by arranging the anchor electronic asset and one or more additional electronic assets into the electronic display page;

causing, by the one or more processors of the electronic asset server system, the electronic display page to be sent to the user device for display.

2. The method of claim 1, wherein the anchor electronic asset and one or more additional electronic assets displayed on the electronic display page are arranged using display parameters of the user device.

3. The method of claim 1, wherein the one or more additional electronic assets are selected based on a relationship between each electronic asset among the one or more additional electronic assets and the anchor electronic asset.

4. The method of claim 1, wherein each electronic asset among the one or more additional electronic assets is selected based on a relationship between said each electronic asset and the anchor electronic asset, and wherein said each electronic asset is selected based on a relationship between said each electronic asset and all other electronic assets in the one or more additional electronic assets.

5. The method of claim 1, wherein each electronic asset among the one or more additional electronic assets is selected based on a relationship between said each electronic asset and each other electronic asset among the one or more additional electronic assets that was selected previous to said each electronic asset.

6. The method of claim 1, wherein the anchor electronic asset is textual.

7. The method of claim 1, wherein the one or more additional electronic assets are selected based on a common theme of the one or more additional electronic assets.

8. The method of claim 1, wherein each electronic asset among the one or more additional electronic assets is selected based on a variable probability.

9. The method of claim 1, wherein at least a portion of the one or more additional electronic assets is selected and arranged in the electronic display page based on human senses.

10. A server, comprising:

one or more processors; and a memory storing instructions, which when executed by the one or more processors, cause the one or more processors to:

causing, by one or more processors of an electronic asset server system, a set of electronic assets among a plurality of electronic assets to be displayed to a user on a user device;

receiving, by the one or more processors of the electronic asset server system from the user device, user interaction data that indicates user interactions with the set of electronic assets;

determining, by the one or more processors of the electronic asset server system and based at least partially on the user interaction data, a termination of consumption of a particular electronic asset of the set of electronic assets;

upon the determination of the termination of consumption of the particular electronic asset:

selecting, by the one or more processors of the electronic asset server system and based at least in part on display parameters of the user device and a computer-implemented rule, an anchor electronic asset from the plurality of electronic assets, the anchor electronic asset is selected based on the display parameters of the user device such that the user device can present the anchor electronic asset to the user;

selecting, by the one or more processors of the electronic asset server selecting, by the one or more processors of the electronic asset server system and based at least in part on pairwise comparisons with one or more features of the selected anchor electronic asset, one or more additional electronic assets from the plurality of electronic assets related to the anchor electronic asset, wherein the one or more features of the selected anchor electronic asset include a specific feature identifying whether the selected anchor electronic asset is a video file, wherein a similarity matrix comprising matrix values generated from the pairwise comparisons is used to select the one or more additional electronic assets for co-displaying with the anchor electronic asset on an image display of the user device;

generating, by the one or more processors of the electronic asset server system, an electronic display page by arranging the anchor electronic asset and one or more additional electronic assets into the electronic display page;

causing, by the one or more processors of the electronic asset server system, the electronic display page to be sent to the user device for display.

11. The server of claim 10, wherein the anchor electronic asset and one or more additional electronic assets displayed on the electronic display page are arranged using display parameters of the user device.

12. The server of claim 10, wherein the one or more additional electronic assets are selected based on a relationship between each electronic asset among the one or more additional electronic assets and the anchor electronic asset.

13. The server of claim 10, wherein each electronic asset among the one or more additional electronic assets is selected based on a relationship between said each electronic asset and the anchor electronic asset, and wherein said each electronic asset is selected based on a relationship between said each electronic asset and all other electronic assets in the one or more additional electronic assets.

14. The server of claim 10, wherein each electronic asset among the one or more additional electronic assets is selected based on a relationship between said each electronic asset and each other electronic asset among the one or more additional electronic assets that was selected previous to said each electronic asset.

15. The server of claim 10, wherein the anchor electronic asset is textual.

16. The server of claim 10, wherein the one or more additional electronic assets are selected based on a common theme of the one or more additional electronic assets.

17. The server of claim 10, wherein each electronic asset among the one or more additional electronic assets is selected based on a variable probability.

18. The server of claim 10, wherein at least a portion of the one or more additional electronic assets is selected and arranged in the electronic display page based on human senses.

19. A non-transitory computer-readable medium storing one or more sequences of instructions, which when executed by one or more processors, cause the one or more processors to perform:

causing, by one or more processors of an electronic asset server system, a set of electronic assets among a plurality of electronic assets to be displayed to a user on a user device;

receiving, by the one or more processors of the electronic asset server system from the user device user interaction data that indicates user interactions with the set of electronic assets;

determining, by the one or more processors of the electronic asset server system and based at least partially on the user interaction data, a termination of consumption of a particular electronic asset of the set of electronic assets;

upon the determination of the termination of consumption of the particular electronic asset:

selecting, by the one or more processors of the electronic asset server system and based at least in part on display parameters of the user device and a computer-implemented rule, an anchor electronic asset from the plurality of electronic assets, the anchor electronic asset is selected based on the display parameters of the user device such that the user device can present the anchor electronic asset to the user;

selecting, by the one or more processors of the electronic asset server system and selecting, by the one or more processors of the electronic asset server system and based at least in part on pairwise comparisons with one or more features of the selected anchor electronic asset, one or more additional electronic assets from the plurality of electronic assets related to the anchor electronic asset, wherein the one or more features of the selected anchor electronic asset include a specific feature identifying whether the selected anchor electronic asset is a video file, wherein a similarity matrix comprising matrix values generated from the pairwise comparisons is used to select the one or more additional electronic assets for co-displaying with the anchor electronic asset on an image display of the user device;

generating, by the one or more processors of the electronic asset server system, an electronic display page by arranging the anchor electronic asset and one or more additional electronic assets into the electronic display page;

causing, by the one or more processors of the electronic asset server system, the electronic display page to be sent to the user device for display.

20. The non-transitory computer-readable medium of claim 19, wherein the anchor electronic asset and one or more additional electronic assets displayed on the electronic display page are arranged using display parameters of the user device.

21. The non-transitory computer-readable medium of claim 19, wherein the one or more additional electronic assets are selected based on a relationship between each electronic asset among the one or more additional electronic assets and the anchor electronic asset.

22. The non-transitory computer-readable medium of claim 19, wherein each electronic asset among the one or more additional electronic assets is selected based on a relationship between said each electronic asset and the anchor electronic asset, and wherein said each electronic asset is selected based on a relationship between said each electronic asset and all other electronic assets in the one or more additional electronic assets.

23. The non-transitory computer-readable medium of claim 19, wherein each electronic asset among the one or more additional electronic assets is selected based on a relationship between said each electronic asset and each other electronic asset among the one or more additional electronic assets that was selected previous to said each electronic asset.

24. The non-transitory computer-readable medium of claim 19, wherein the anchor electronic asset is textual.

25. The non-transitory computer-readable medium of claim 19, wherein the one or more additional electronic assets are selected based on a common theme of the one or more additional electronic assets.

26. The non-transitory computer-readable medium of claim 19, wherein each electronic asset among the one or more additional electronic assets is selected based on a variable probability.

27. The non-transitory computer-readable medium of claim 19, wherein at least a portion of the one or more additional electronic assets is selected and arranged in the electronic display page based on human senses.

\* \* \* \* \*

UNITED STATES PATENT AND TRADEMARK OFFICE
CERTIFICATE OF CORRECTION

PATENT NO. : 11,763,173 B2
APPLICATION NO. : 14/811803
DATED : September 19, 2023
INVENTOR(S) : Thomas J. Sullivan et al.

It is certified that error appears in the above-identified patent and that said Letters Patent is hereby corrected as shown below:

In the Claims

Column 21
Claim 1: Line 31: Delete "and selecting, by the one"
Claim 1: Line 32: Delete "or more processors of the electronic asset server"
Claim 1: Line 33: Delete "system"

Column 22
Claim 10: Line 52: Delete "selecting, by the one or"
Claim 10: Line 53: Delete "more processor of the electronic asset server"

Column 24
Claim 19: Line 5: Delete "and selecting, by the one"
Claim 19: Line 6: Delete "or more processors of the electronic asset server"
Claim 19: Line 7: Delete "system"

Signed and Sealed this
Seventeenth Day of October, 2023

Katherine Kelly Vidal
*Director of the United States Patent and Trademark Office*